(12) United States Patent
Watarai

(10) Patent No.: US 6,366,126 B1
(45) Date of Patent: Apr. 2, 2002

(54) INPUT CIRCUIT, OUTPUT CIRCUIT, AND INPUT/OUTPUT CIRCUIT AND SIGNAL TRANSMISSION SYSTEM USING THE SAME INPUT/OUTPUT CIRCUIT

(75) Inventor: Seiichi Watarai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/458,055

(22) Filed: Dec. 10, 1999

(30) Foreign Application Priority Data

Dec. 11, 1998 (JP) .......................................... 10-353564

(51) Int. Cl.$^7$ ...................... H03K 19/02; H03K 19/094; H03K 19/0175
(52) U.S. Cl. .............................. 326/83; 326/57; 327/69
(58) Field of Search .............................. 326/86, 83, 57, 326/58; 327/56, 65, 69

(56) References Cited

U.S. PATENT DOCUMENTS

| 4,680,491 A | * | 7/1987 | Yokouchi et al. ............. 326/86 |
| 4,697,107 A | * | 9/1987 | Haines ........................ 307/474 |
| 5,017,813 A | * | 5/1991 | Galbraith et al. ........... 307/475 |
| 5,162,676 A | * | 11/1992 | Aoki et al. .................. 307/475 |
| 5,208,492 A | * | 5/1993 | Masumoto et al. ........... 326/87 |
| 5,248,909 A | * | 9/1993 | Aoki et al. .................. 307/475 |
| 5,331,220 A | * | 7/1994 | Pierce et al. ................ 307/475 |
| 5,521,531 A | * | 5/1996 | Okuzumi ....................... 326/81 |
| 5,729,156 A | * | 3/1998 | Lim ............................. 326/73 |

FOREIGN PATENT DOCUMENTS

| JP | 60-143498 | | 7/1985 | |
| JP | 62018115 A | * | 1/1987 | .................. 326/58 |
| JP | 4-256217 | | 9/1992 | |
| JP | 6-45909 | | 2/1994 | |
| JP | 9-46207 | | 2/1997 | |

\* cited by examiner

Primary Examiner—Michael Tokar
Assistant Examiner—Daniel D. Chang
(74) Attorney, Agent, or Firm—Whitham, Curtis & Christofferson, P.C.

(57) ABSTRACT

There is provided a signal transmission system, wherein when a control signal which puts an output terminal of an output circuit 12A into a high-impedance state is supplied to the output circuit 12A and an input circuit 14A, power is fed to the input circuit 12A to operate it and, at the same time, power-feeding to the output circuit 12A is stopped; and when the control signal is not supplied to the output circuit 12A nor the input circuit 14A, power is fed to the output circuit 12A to operate it and, at the same time, power-feeding to the input circuit 12A is stopped. Also, a signal of an expected value of the output circuit 12A based on the control signal is generated from an OR circuit 45.

4 Claims, 7 Drawing Sheets

INPUT CIRCUIT, OUTPUT CIRCUIT, AND INPUT/OUTPUT CIRCUIT AND SIGNAL TRANSMISSION SYSTEM USING THE SAME INPUT/OUTPUT CIRCUIT

BACKGROUND OF THE INVENTION

1. Field of the Invention

The present invention relates to an input circuit, an output circuit, and an input/output circuit and a signal transmission system using the same input/output circuit.

2. Description of the Related Art

There are two modes for transmitting logical signals by using small-amplitude transmission signals via a transmission line such as for example a dual bus line between a plurality of integrated circuits by using a communication transmission device, a computer, etc; a single-phase transmission mode and a differential transmission mode.

The single-phase transmission mode permits a small-amplitude signal utilized in signal transmission, to be transmitted via a dual bus line, while the differential transmission mode permits a small-amplitude signal equivalent to a transfer signal for the single-phase transmission mode to be transmitted via one line of the dual bus line and, at the same time, to permit a signal obtained by converting only the phase of the above-mentioned small-amplitude signal, to be transmitted via the other line of the dual bus line. The following will describe the differential transmission mode.

When such a differential transmission mode is used to transmit logical signals using the above-mentioned two signals via a dual bus line between a plurality of integrated circuits, an output circuit is employed which sends the logical signals onto these transmission lines. In a case where this output circuit is used to transmit logical signals, a logical signal to be transmitted (also called transmission signal) represents, respectively, a logical value "1" or "0" when one of the two transmission lines is of a high-level voltage and the other is of a low-level voltage and logical value "0" or "1" when one of the dual transmission line is of a low-level voltage and the other is of a high-level voltage. When an output circuit is outputting a logical value 1 or 0, it is said to be outputting a state 1 or a state 0 respectively.

In most cases, a voltage amplitude between a high level and a low level of those two output states has been of such a value of a supply voltage fed to integrated circuits.

In recent years, however, in more and more cases an extremely small amplitude of a signal is transmitted. In a case of a CMOS interface, for example, an amplitude of its conventional transmission signal has typically been about 5V or about 3V, which is nearly equivalent to a feeding supply voltage. As against this, in a case of for example a small-amplitude of signal transmission for an LVDS (Low Voltage Differential Signaling) interface, its signal amplitude in recent years is very small value of about 0.3V.

The reason why a signal amplitude is reduced to such a small value is that the reduction has large effects in for example improving a transmission rate and decreasing power dissipation and noise which occurs during signal transmission.

Thus, there is a need to use a low-amplitude interface output circuit for sending of a low-amplitude signal, in order to obtain the above-mentioned effects in an integrated circuit which has a basic concept of high-speed performance or low-power dissipation.

A low-amplitude interface output circuit which may meet such a need commonly uses as its output amplitude a small signal amplitude smaller than a supply voltage, in order to achieve high-speed, low-power dissipation, and low-noise performance. As such a low-amplitude interface output circuit are known, besides the above-mentioned LVDS, a configuration of GTL (Gunning Transceiver Logic), CTT (Center Tapped Termination), and PECL (Pseudo Emitter Coupled Logic). In the case of a PECL configuration of these low-amplitude interfaces for example, as against about 3V or about 5V as a value of its supply voltage, about a 0.6V is used as an amplitude of a signal which is employed. As a means for transferring such a small-amplitude signal, a terminating voltage source and a terminating resistor are utilized.

FIG. 4 shows an example of a small-amplitude interface circuit having this configuration.

This type of a low-amplitude interface circuit is used in a signal transmission system which uses integrated circuits. The low-amplitude interface circuit used, as shown in FIG. 4, in this signal transmission system is provided between its bus line 2 and input/output circuits $4_1$, $4_2$, $4_3$, and $4_4$ of a plurality of semiconductor integrated circuits IC1, IC2, and IC3 respectively. The bus line 2 consists of two lines L1 and L2 and is connected via terminating resistors RL1 and RL2 to a terminating power supply VS. This terminating power supply VS has $V_{TT}$ as its terminating voltage value. An input/output circuit 41 consists of an output circuit $4_1O$ and an input circuit $4_1I$, which output circuit $4_1O$ is supplied with an Enable signal EN from a CMOS internal circuit $5_1$. The output circuit $4_1O$, when supplied with the Enable signal EN, is set in an operative state (enabled state) and, when not supplied with it, is set in an inoperative state (disabled state) with its output being set in a high-impedance state simultaneously. Note here that a reference character IN shown in FIG. 4 indicates an input signal sent from a CMOS internal circuit 51 to a CMOS internal circuit 41O, while a reference character OUT indicates an output signal sent from the input circuit 41I to the CMOS internal circuit 51. Reference numerals $IO_{11}$ and $IO_{12}$ indicate respective output terminals of the input/output circuit 41, which are connected to the two lines L1 and L2 of the bus line 2.

Description of the input/output circuits $4_2$, $4_3$, and $4_4$ is omitted here because they are of the same configuration as the input/output circuit 41 and provided with subscripts of 2, 3, and 4 at their reference numerals in the input and output circuits and the CMOS internal circuit.

An example of a known circuit used as these input/output circuits $4_1$, $4_2$, $4_3$, and $4_4$ is shown in FIG. 5. An input/output circuit 10 shown in FIG. 5 comprises an output circuit 12 and an input circuit 14. The input/output circuit 10 comes in the input/output circuit 41 for example. An output circuit 12 comprises: an input-signal supply circuit 16 (see FIG. 6) which inputs input signals; a reference voltage source 18; a differential amplifier stage 20; an enabled/disable-state switching circuit 22 (see FIG. 7); a differential amplifier stage 24; and an output stage 26. The input circuit 14 comprises: a differential amplifier stage 42; an output stage 44; and a buffer B1.

The input-signal supply circuit 16 consists of a buffer 30 connected to an input terminal 28, and an inverter 32.

The differential amplifier stage 20 comprises n-channel type MOSFETs N1, N2, and N3 and resistors R1 and R2. A drain of the n-channel type MOSFET N1 is connected via the resistor R1 to the voltage source $V_{DD}$ and its source, to the n-channel type MOSFET N3 at its drain. Also, a drain of the n-channel type MOSFET N2 is connected via the resistor R2 to the voltage source $V_{DD}$ and its source, to the n-channel type MOSFET N3 at its drain. Also, a source of the n-channel type MOSFET N3 is connected to the ground potential. A gate of the n-channel type MOSFET N1 is connected is connected to the input-circuit supply circuit at its signal terminal 36. A gate of the n-channel type MOSFET N2 is connected to the input-signal supply circuit 16 at its output terminal 34. A gate of the n-channel type MOSFET N3 is connected to a reference-voltage source 18 at its output terminal. The n-channel type MOSFET N3 constitutes a current source.

The resistor R1 and the n-channel type MOSFET N1 constitute one branch circuit of the differential amplifier stage 20 and the resistor R2 and the n-channel type MOSFET N2, the other branch circuit of the differential amplifier stage 20.

The enabled/disabled-state switching circuit 22 consist of an inverter 38 which has its input connected to an input terminal 39 at its output to an output terminal 40.

Also, the differential amplifier stage 24 comprises: n-channel MOSFETs N4, N5, and N6; p-channel type MOSFETs P1 and P2; and resistors R3 and R4. The p-channel type MOSFET P1 has its source connected to the voltage source $V_{DD}$ and its drain, to the n-channel type MOSFET N4 at its drain via the resistor R3. The n-channel type MOSFET N4 has its source connected to the n-channel type MOSFET N6 at its drain. The p-channel type MOSFET P2 has its source connected to the voltage source $V_{DD}$ and its drain, to the n-channel type MOSFET N5 at its drain via the resistor R4. The n-channel type MOSFET N5 has its source connected to the n-channel type MOSFET N6 at its drain. The n-channel type MOSFET N6 has its source connected to the ground potential.

The gate of the p-channel type MOSFET O1 and that of the p-channel type MOSFET P2 are connected to the enabled/disabled-state switching circuit 22 at its output terminal 40. The n-channel type MOSFET N4 has its gate connected to the differential amplifier stage 20 at its output terminal O1. The n-channel type MOSFET N5 has its gate connected to the differential amplifier stage 20 at its output terminal O2. The n-channel type MOSFET N6 has its gate connected to the reference voltage source 18 at its output terminal. The n-channel type MOSFET N6 constitutes a current source.

The output stage 26 comprises n-channel type MOSFETs N7, N8, N9, and N10. The n-channel type MOSFET N7 has its drain connected to the voltage source VDD and its source, to an output terminal 29 (e.g., IO11 in FIG. 4). The n-channel type MOSFET N7 has its gate connected to the differential amplifier stage 24 at its output terminal O3 and also to the n-channel type MOSFET N8 at its drain. The n-channel type MOSFET N8 has its source connected to the ground potential. The n-channel type MOSFET N9 has its drain connected to the voltage source VDD and its source, to the output terminal 27 (e.g., IO12 in FIG. 4). The n-channel type MOSFET N9 has its gate connected to the differential amplifier stage at its output terminal O4 and also to the n-channel type MOSFET N10 at its drain. The n-channel type MOSFET N10 has its source connected to the ground potential.

The differential amplifier stage 42 of the input circuit 14 comprises n-channel type MOSFETs N11, N12, N13 and p-channel type MOSFETs P3 and P4. The p-channel type MOSFET P3 has its source connected to the voltage source VDD and its drain connected N11 has its source connected to the n-channel type MOSFET N13 to the n-channel type MOSFET N11 at its drain. The n-channel type MOSFET at its drain. Also, the p-channel type MOSFET P4 has its source connected to the voltage source and its drain, to the n-channel type MOSFET N12 at its drain. The n-channel type MOSFET N12 has its source connected to the n-channel type MOSFET N13 at its drain. The n-channel type MOSFET N13 has its source connected to the ground potential. Also, the gate of the p-channel type MOSFET P3 and that of the p-channel type MOSFET P4 are interconnected, while the gate and the drain of the p-channel type MOSFET P4 are interconnected.

The n-channel type MOSFET N11 has its gate connected to the input/output circuit at its output terminal IOA and that of the n-channel type MOSFET N12, to the input/output circuit 10 at its output terminal IOB. The n-channel type MOSFET N13 has its gate connected to the reference voltage source at its output terminal. The n-channel type MOSFET N13 constitutes a current source. The p-channel type MOSFETs P3 and P4 constitute an active load.

The output stage 44 comprises an n-channel type MOSFET N14 and a p-channel type MOSFET P5. The p-channel type MOSFET P5 has its source connected to the voltage source VDD and its drain connected to the n-channel type MOSFET N14 at its drain. The n-channel type MOSFET N14 has its source connected to the ground potential. An interconnection point between the drain of the p-channel type MOSFET P5 and that of the n-channel type MOSFET N14 is connected via the buffer B1 to the output terminal OUT. The n-channel type MOSFET N14 has its gate connected to the reference voltage source 16 at its output. The n-channel type MOSFET N14 constitutes an active load.

The above-mentioned buffer B1 operates to restore an input voltage level to such a level (e.g., a full VDD value or a value roughly equivalent to it) that can be used at a CMOS internal circuit.

Now, operations of the input/output circuit in this configuration are described below with reference to FIGS. 4 through 8.

Here, such a case is described that a high-level of the Enable signal which sets the output circuit 12 (e.g., output circuit $4_1$O in FIG. 4) into an enabled state is supplied to the enabled/disabled-state switching circuit 22 at its input terminal 39 and a trailing edge of an input signal is input to the input-signal supply circuit 16 at its input terminal 28 (period ① in FIG. 8). The high-level Enable signal sets the output circuit into an output state, i.e. enabled state.

When the above-mentioned input signal is input, the n-channel MOSFET N1 is supplied with a high-level voltage at its gate (period ① in FIG. 8B), the n-channel type MOSFET N2 of the differential amplifier stage 20 is supplied at its gate with a level-level voltage (period ① in FIG. 8-A), to put the n-channel type MOSFET N1 into a conducting state (hereinafter expressed as "turned on") and the n-channel MOSFET N2 into a non-conducting state (hereinafter expressed as "turned off").

Through the n-channel MOSFET N3 which constitutes a current source for the differential amplifier stage 20 is flowing a current I1 constantly irrespective of whether the transistors which constitute a branch circuit of the differential amplifier stage 20 are on or off (see I1 in FIG. 8).

Thus, a low-level voltage is output from the output terminal O1 of the differential amplifier stage 20 and a high-level voltage, from its output terminal O2.

Also, a low-level voltage from the enabled/disabled-state switching circuit 22 is applied to the p-channel type MOSFETs P1 and P2 of the differential amplifier stage 24 at their gate, thereby turning on these transistors P1 and P2.

Then, a low-level voltage from the output terminal O1 of the differential amplifier stage 20 is applied to the n-channel type MOKSFET N4 at its gate and, at the same time, a high-level voltage from its output terminal O2 is applied to the n-channel type MOSFET N5 at its gate, thereby turning the n-channel type MOSFET N4 off and turning the n-channel MOSFET N5 on.

Thus, a high-level voltage is output from the output terminal O3 of the differential amplifier stage 24 and a low-level voltage, from the output terminal O4.

Also, a low-level voltage from the enabled/disabled-state switching circuit 22 is applied to the n-channel type MOSFET N8 and N10 of the output stage 26 at their gate (period ① in FIG. 8-C), thereby turning these transistors off.

Then, a high-level voltage from the output terminal O3 of the differential amplifier stage 24 is applied to the n-channel type MOSFET N7 of the output stage at its gate and, at the same time, a low-level voltage from the output terminal O4 is applied to the n-channel type MOSFET N9 at its gate. Both of these transistors N7 and N9 are always in an on-state because they constitute a source-follower circuit, thus operating to shift a level of a signal input to their respective gates.

Therefore, a low-level signal IOA from the output stage 26 is output to one output terminal 27 (period ① in FIG. 8-IOA) and a high-level signal IOB from it, to the other output terminal 29 (period ① in FIG. 8-IOB).

Thus output low-level signal output to the output terminal 27 and a high-level signal output to the output terminal 29 are combined to represent a signal output state (e.g., a binary value "0" represented by the states of these signal outputs), which is transmitted to other integrated circuits via the bus line 2.

It is here assumed for example that the above-mentioned binary value "0" is transmitted from the input/output circuit 4₂ of a signal-transmission system shown in FIG. 4 to the input/output circuit 4₃ in an identical semiconductor circuit IC1. In this case, the output circuit 4₃O of the input/output circuit 4₃ is set in a high-impedance state by Enable signal EN supplied from the CMOS internal circuit 5₃. The input circuit 4₃I receives binary value "0" transmitted via the bus line 2 and outputs it to the CMOS internal circuit 5₃. The CMOS internal circuit 5₃ thus receives binary value "0."

In this case, however, although the input circuits 4₁I and 4₄I of the input/output circuits 4₁ and 4₄ also receive binary value "0" and output it respectively, their corresponding CMOS internal circuits 5₁ and 5₄ are, at that point in time, not in an operative state for receiving binary value "0" from their corresponding input circuits 4₁I and 4₄I respectively, so that they only receive binary value "0" supplied at their input and do not process the signal, i.e. they do not recognize the binary value "0."

As mentioned above, the binary value "0" transmitted onto the bus line 2 is input also to the input circuit 41 of the input/output circuit 41 itself which has transmitted this binary value "0", i.e. to the input circuit 14 in FIG. 5.

The low-level and high-level voltages which represent, in combination, that binary value "0" are input to the differential amplifier stage 42. This differential amplifier 42 is always flowing through itself a current I2 (which is shown as I2 in FIG. 8).

The above-mentioned low-level voltage is applied to the n-channel type MOSFET N11 of that differential amplifier 42 at its gate and that high-level voltage is applied to the n-channel type MOSFET N12 at its gate, thus turning off the n-channel type MOSFET N11 and turning on the n-channel type MOSFET N12.

With this, a high-level voltage is applied to the p-channel type MOSFET at its gate, to reduce the conductivity of that MOKSFET PS, thus decreasing a current flowing through that MOSFET PS (period ① in FIG. 8-I3). Reduction in the conductivity of this MOSFET P5 causes a low-level voltage to be applied to the buffer B1. The buffer B1 then clamps thus applied low-level voltage to a low CMOS level. Then, the low-level voltage thus clamped at a CMOS level is provided to the input circuit 14 at its output terminal OUT. Therefore, there is no possibility that a through current may flow through the CMOS transistors of the CMOS internal circuit.

Likewise, also when a high-level of the input signal IN is input to the input-signal supply circuit 16 at its input terminal 28 (period ② in FIG. 8), two signals are transmitted onto the bus line 2 and, at the same time, a high-level voltage which corresponds to binary value "1" represented by the output states (a high-level state at the output terminal 27 and a low-level state at the terminal 29) (period ② in FIGS. IOA and IOB) of these transmitted two signals is output from the output terminal 46 of the input circuit 14 (period ② in FIG. 8-OUT) . This high-level voltage is also clamped at a high CMOS level. In this case also, there is no possibility that a through current may flow through the MOC transistors of the CMOS internal circuit.

If the output circuit 12 does not transmit a signal and need not do so, the Enable signal EN applied to the enabled/disabled-state switching circuit 22 at its input terminal 39 becomes low (periods ④ and subsequent in FIG. 8), which sets the output circuit 12 into a disabled state. Then, the enabled/disabled-state switching circuit 22 generates a high-level voltage (periods ④ and subsequent in FIG. 8-C), to turn off the p-channel type MOSFETs P1 and P2 and turn on the n-channel type MOSFETs N8 and N10 and turns off the n-channel type MOSFETs N7 and N9 of the differential amplifier 24 of the output circuit 12, thus rendering the output circuit 12 disabled (inoperative state). At this point in time, the n-channel type MOSFETs N7 and N9 are in an off-state, so that there is provided a high-impedance state between the output terminals 27 and 29 (periods ④ Hz and subsequent in FIGS. IOA and IOB).

Therefore, the above-mentioned conventional output circuit 12 of the input/output circuit 10 is provided with a means which puts the circuit 12 in a disabled state for saving power dissipation.

Thus the Enable signal EN operates to provide a low-level output voltage, to turn off the n-channel type MOSFETs N7 and N9, thus giving a high-impedance state of the output.

Note here that the output terminals 27 and 29 in the above-mentioned high-impedance state take on a voltage level VTT of the terminating power supply. This voltage level VTT is present at a middle between a high and low levels of the signal represented by FIGS. IOA and IOB (period ④ in FIGS. 8-IOA and 8-IOB). The periods ⑤ and subsequent in FIGS. 8-IOA and 8-IOB indicate that an input signal is supplied from a semiconductor integrated circuit in question itself or any other via the bus line 2 to the output terminals 27 and 29, which are input terminals as viewed from the input circuit 14.

If, therefore, an input signal is input via the bus line 2 from a semiconductor integrated circuit in question or any other with the output terminals 27 and 29 of the output circuit 12 in a high-impedance state, these output terminals 27 and 29 take on a voltage level of that input signal (periods ⑤ and subsequent in FIG. 8).

A main purpose of the output circuit 12 of the above-mentioned conventional input/output circuit 10 is to provide a low level of the Enable signal EN in order to turn off the p-channel type MOSFETs P1 and P2 as well as the n-channel type MOSFETs N7 and N9, thus putting the output terminal in a high-impedance state.

When a high-impedance state is thus obtained, the differential amplifier stage 24 of the output circuit 12 dissipates no power for sure; nevertheless, the power dissipation as a whole cannot be eliminated because a current id always flowing the differential amplifier stage 24.

Therefore, although power is saved to some extent at the output circuit 12, it is not enough.

When the input circuit 14 is viewed from the point of power saving, as mentioned above, that circuit 14 is provided with no power saving means because its differential amplifier stage and output stage are always electrified.

Therefore, the conventional input/output circuits still have problems to solve.

Also, Japanese Laid-Open Patent Publication Sho-60-143498 only shows a circuit to interrupt the sending of output signals and tells nothing about power saving on the circuit by interrupting of the sending of that output signal.

Also, when the output circuit 12 of the input/output circuit 10 is operating, the conventional input circuit 14 outputs at its output terminal a voltage level which corresponds to binary-value signals transmitted via the bus line 2 from that output circuit 12.

With this, when the output circuit 12 is sending a signal, generally, the CMOS internal circuit connected to that output circuit 14 does not process the coming signal and does not recognize it. Therefore, when the CMOS internal circuit starts to operate, a signal desired to be received from the input circuit, i.e. a signal of an expected value is in not all cases output from the input circuit 14.

With this, even when the input circuit 14 is outputting an expected-value signal, as far as the same signal as that expected-value one is input from a semiconductor integrated circuit in question or any other, there is provided no possibility of the CMOS internal circuit receiving error data; however, if signal different from that output by the input circuit 14 is input from a semiconductor integrated circuit in question or any other, it may receive error data, which may constitute a disadvantage.

SUMMARY OF THE INVENTION

In view of the above, it is a first object of the present invention to provide an input circuit, an output circuit, an input/output circuit, and a signal transmission system provided with the same input/output circuit that can save on power dissipation by utilizing a control signal to set an output terminal in a high-impedance state.

It is a second object of the present invention to provide an input circuit, an output circuit, an input/output circuit, and a signal transmission system that can output from the input circuit a signal of an expected value which is given based on a control signal which sets an output terminal in a high-impedance state.

According to a first aspect of the present invention, there is provided an input circuit having a current source, wherein when a signal which gives rise to an input operation is not supplied, the current source for feeding power to the input circuit is stopped based on a fact that the signal is not supplied.

Also, according to a second aspect of the present invention, there is provided an output circuit having a current source, wherein when a signal which gives rise to an output operation is not supplied, the current source for feeding power to the output circuit is stopped based on a fact that the signal is not supplied.

Further, according to a third aspect of the present invention, there is provided an input/output circuit which comprises an output circuit and an input circuit which has an input terminal thereof connected with the output circuit at an output terminal thereof in such a configuration that when a control signal is supplied to the output circuit, the output terminal of the output circuit is put into a high-impedance state, wherein such a power-feeding control circuit is provided to the input circuit that feeds power to the input circuit when the control signal is supplied and stops a current source for feeding power to the input circuit when the control signal is not supplied.

In the foregoing third aspect, a preferable mode is one wherein the control signal is supplied from one signal terminal to the input circuit and the output circuit.

Also, a preferable mode is one wherein the power-feeding control circuit provided to the input circuit acts to turn on/off a current source of a differential amplifier stage which constitutes the input circuit.

Also, a preferable mode is one wherein the power-feeding control circuit provided to the input circuit acts to turn on/off an active load of an output stage which constitutes the input circuit.

Also, a preferable mode is one wherein such a power-feeding control circuit is provided to the output circuit that feeds power to the output circuit when the control signal is not supplied to the the output circuit and stops a current source for feeding power to the output circuit when the control signal is supplied to the output circuit.

Also, a preferable mode is one wherein the output circuit is comprised of a differential amplifier stage including the current source; and a power-feeding control circuit provided to the output circuit turns on/off the current source included in the differential amplifier stage.

Also, a preferable mode is one wherein a signal output circuit which outputs a signal of an expected value based on the control signal is provided to the input circuit, to output a signal of an expected value from the signal output circuit to an output terminal of the input circuit based on the control signal supplied thereto.

According to a fourth aspect of the present, there is provided a signal transmission system which comprises an input/output circuit which circuit has: a semiconductor integrated circuit which has at least an input/output circuit which has an output circuit and an input circuit which has an input terminal thereof connected to the output circuit at an output terminal thereof in such a configuration that when a control signal is supplied to the output circuit, the output circuit has an output terminal thereof put into a high-impedance state; and a bus line which interconnects an output terminal of the output circuit of the semiconductor integrated circuit and an input terminal of the input circuit, wherein the input circuit is provided with such a power-feeding control circuit for feeding power to the input circuit when the control signal is supplied to the input circuit and stops a current source for feeding power to the input circuit when the control signal is not supplied to the input circuit.

In the foregoing fourth aspect, a preferable mode is one wherein the output circuit is provided with such a power-feeding control circuit that feeds power to the output circuit when the control signal is not supplied to the output circuit and stops a current source for feeding power to the output circuit when the control signal is supplied to the output.

Also, a preferable mode is one wherein the control signal is supplied from one signal terminal to the input circuit and the output circuit.

Also, a preferable mode is one wherein a signal output circuit for outputting a signal of an expected value based on the control signal is provided to the input circuit, to output from the signal output circuit to the input circuit at an output terminal thereof the signal of an expected value based on the control signal supplied thereto.

Further, a preferable mode is one wherein the input circuit is comprised of a differential amplifier stage which includes the current source; and a power-feeding control circuit provided to the input circuit turns on/off the current source included in the differential amplifier stage.

Furthermore, a preferable mode is one wherein a power-feeding control circuit provided to the input circuit turns on/off an active load of an output stage which constitutes the input circuit.

Still furthermore, a preferable mode is one wherein the output circuit is comprised of a differential amplifier stage which includes the current source; and a power-feeding control circuit provided to the output circuit turns on/off the current source included in the differential amplifier stage.

BRIEF DESCRIPTION OF THE DRAWINGS

The above and other objects, advantages and features of the present invention will be more apparent from the following description when taken in conjunction with the accompanying drawings in which.

DESCRIPTION OF THE PREFERRED EMBODIMENTS

The following will describe preferred embodiments of the present invention with reference to the drawings.

Figure 1:
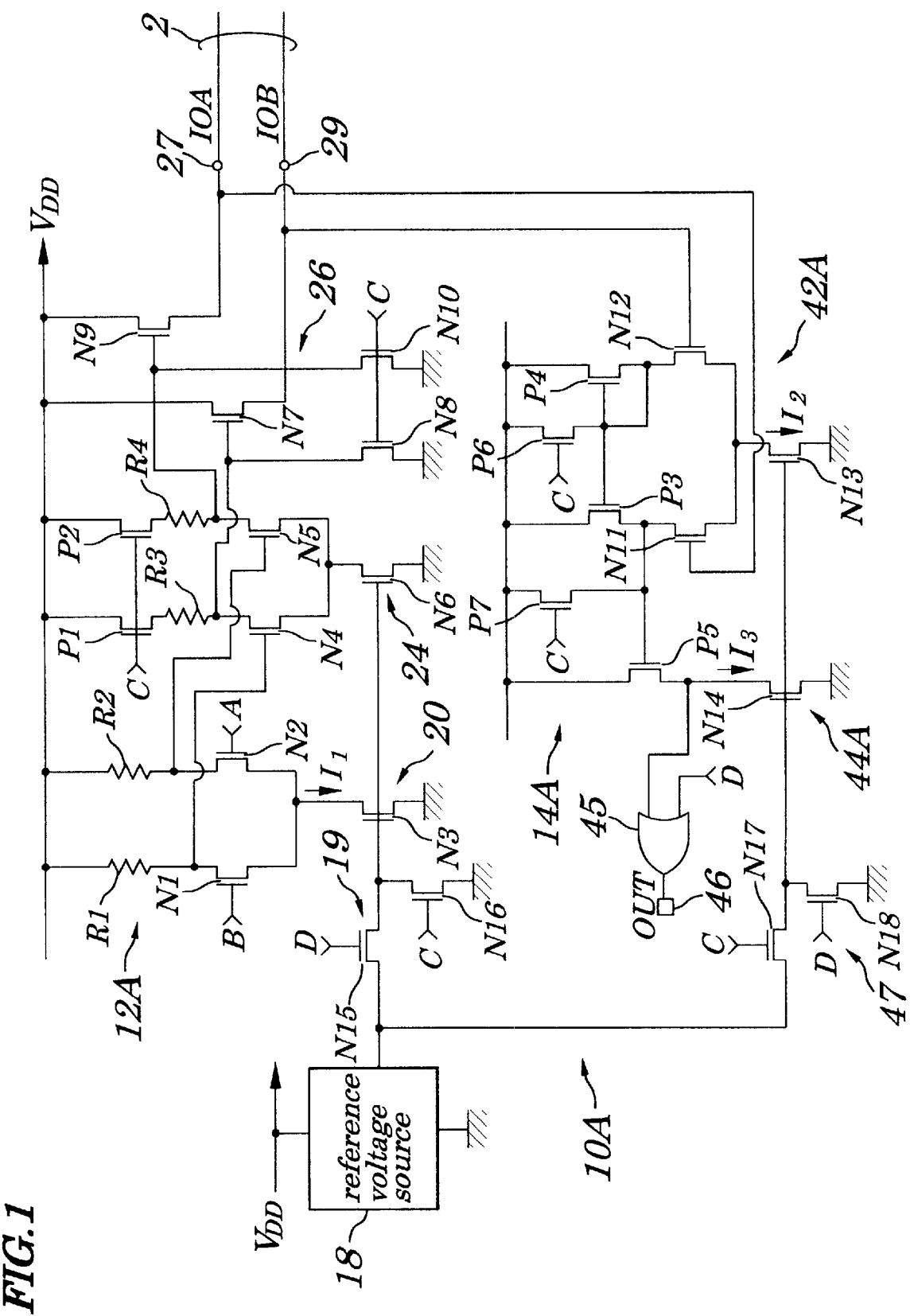
FIG. 1 is a circuit diagram indicating a configuration of an input/output circuit provided to a signal transmission system according to an embodiment of the present invention.

An input/output circuit according to an embodiment shown in FIG. 1 is related to such a circuit that uses a control signal which sets into a high-impedance state an output terminal of an output circuit which constitutes an input/output circuit provided to a signal transmission system, to save power dissipation of the output circuit and an input circuit and, at the same time, when the input circuit is not operating, to output from its output terminal a signal of an expected value based on the above-mentioned control signal, wherein its circuit 10A and output circuit 12 are different from the output circuit 12 of the conventional input/output circuit 10 in that it has a reference-voltage source 18, and a make-and-break control circuit 19 between a differential amplifier stages 20 and 24. Also, an input circuit 14A is different from the conventional input circuit 14 in that it comprises: a differential amplifier stage 42A; an output stage 44A; an OR circuit 45; a current source 18; and a make-and-break control circuit 47 provided between the differential amplifier stage 42A and the output stage 44A. These differences, described later, are just small, with the configurations of the differential amplifier stage 42A and the output stage 44A being almost the same as those of the differential amplifier stage 42 and the output stage 44 of the conventional input circuit 14.

The make-and-break control circuit 19, which constitutes a difference as to the output circuit 12A, consists of; n-channel type MOSFETs N15 and N16; an inverter 38; and a buffer 43.

Figure 2:
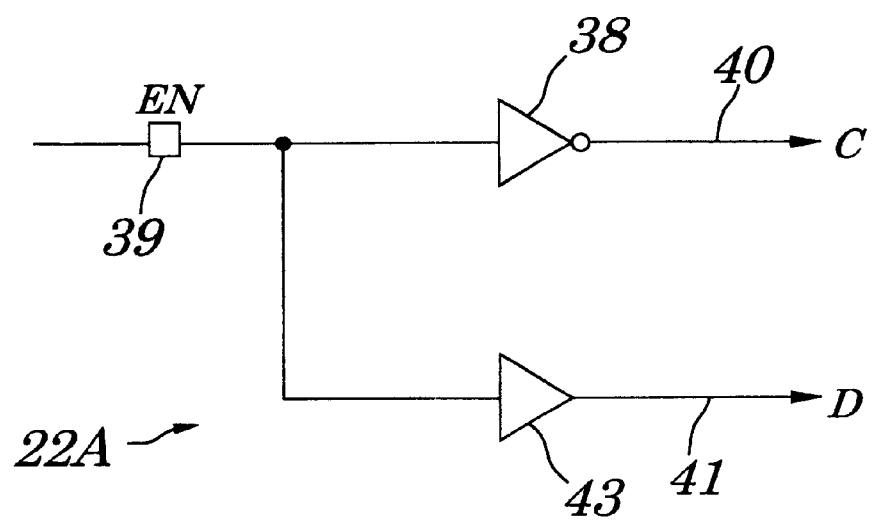
FIG. 2 is a diagram indicating a configuration of a make-and-break control circuit of the same input/output circuit as that shown in FIG. 1.

The inverter 38 and the buffer 43, which constitute in combination a make-and-break control-signal generating circuit 22A, have their inputs connected to the input terminal at which the Enable signal is supplied as shown in FIG. 2, with an output of the inverter 38 being connected to the output terminal 40 and an output of the buffer 43 being connected to the output terminal 41.

The n-channel MOSFET N15 has its drain connected to the reference voltage source at its output terminal and its source connected to a gate of the n-channel type MOSFET N3 of the differential amplifier stage 20 and that of the n-channel type MOSFET N6 of the differential amplifier stage 24. The n-channel type MOSFET N16 has its drain connected to the source of the n-channel type MOSFET N15 and an interconnection point between a gate of the n-channel type MOSFET N3 and that of the n-channel type MOSFET N6 and its source connected to the ground potential. A gate of the n-channel type MOSFET N15 is connected to the make-and-break control-signal generating circuit 22A at its output terminal 41 and that of the n-channel type MOSFET N16, to the same circuit 22A at its output terminal 40.

The input circuit has the following four differences.

A first difference is that the reference voltage source 18 is provided as an output and also that the make-and-break control circuit 47 is provided between a gate of the n-channel type MOSFET N13 of the differential amplifier stage 42 and that of the n-channel type MOSFET N14 of the output stage 44. The make-and-break control circuit 47 consists of n-channel type MOSFETs N17 and N18.

That is, the n-channel type MOSFET N17 has its drain connected to the reference voltage source 18 at its output terminal and its source connected to a gate of the n-channel type MOSFET N13 of the differential amplifier stage 42 and that of the n-channel type MOSFET N14 of the output stage 44. The n-channel type MOSFET N18 has its drain connected to a source of the n-channel type MOSFET N17 and an interconnection point between a gate of the n-channel MOSFET N13 and that of the n-channel type MOSFET N14 and its source connected to the ground potential. A gate of the n-channel type MOSFET N17 is connected to the make-and-break control-signal generating circuit 22A at its output terminal 40 and that of the n-channel type MOSFET N18, to that circuit 22A at its output terminal 41.

A second difference is that a p-channel type MOSFET P6 is provided to the differential amplifier stage of the conventional circuit 14. That is, this difference is that the p-channel type MOSFET P6 has its source connected to the voltage source VDD AND its drain connected to a gate of the p-channel type MOSFET P3 and that of the p-channel type MOSFET P4 of the differential amplifier 42 of the conventional input circuit 14 and also that the p-channel type MOSFET P6 has its gate connected to the make-and-break control-signal generating circuit 22A at its output terminal 40. The differential amplifier stage having this difference is indicated by a reference numeral 42A.

A third difference is that a p-channel type MOSFET P7 is provided in the output stage of the conventional input circuit 14. That is, the difference is that the p-channel type MOSFET P7 has its source connected to the voltage source VDD and its drain connected to a drain of the n-channel type MOSFET N11 of the differential amplifier stage 42 and a gate of the p-channel type MOSFET P5 of the output stage 44 of the conventional input circuit 14 and also its gate connected to the make-and-break control-signal-generating circuit 22A at its output terminal 40. The output stage having this difference is indicated by a reference numeral 44A.

The last difference is that the OR circuit 45 is provided at an output of the output stage 44. That is, the difference is that the OR circuit has one input of itself connected to an interconnection point between a drain of the n-channel type MOSFET N14 and a drain of the p-channel type MOSFET P5 of the output stage 44 and has the other input of itself connected to the make-and-break control-signal generating circuit means 22A to its output terminal 41. This OR circuit 45 operates to clamp a voltage level of its own input to a voltage level of the CMOS internal circuit.

Figure 5:
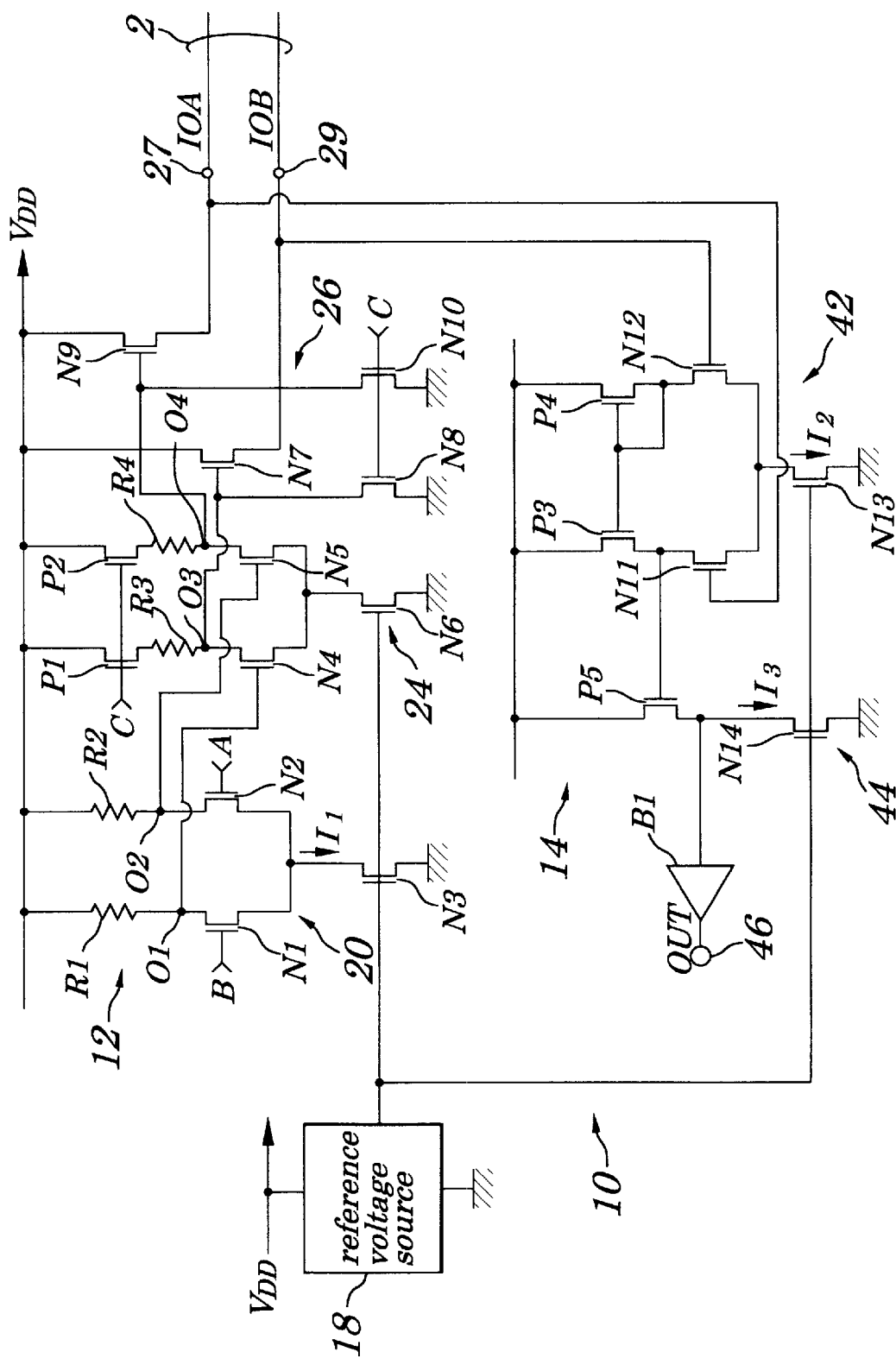
FIG. 5 is a circuit diagram indicating a configuration of an input/output circuit of the same signal transmission system as that shown in FIG. 4.
Figure 6:
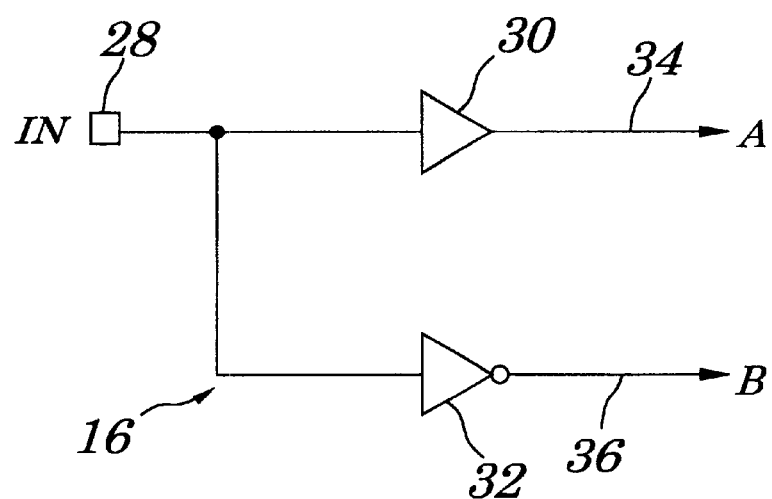
FIG. 6 is a diagram indicating an input-signal supply circuit of the same signal transmission system as that shown in FIG. 4.
Figure 7:
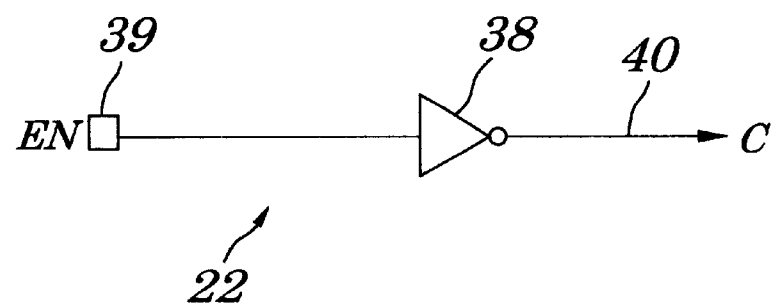
FIG. 7 is a diagram indicating a configuration of an enabled/disabled-state switching circuit of the same signal transmission system as that shown in FIG. 4.
Figure 8:
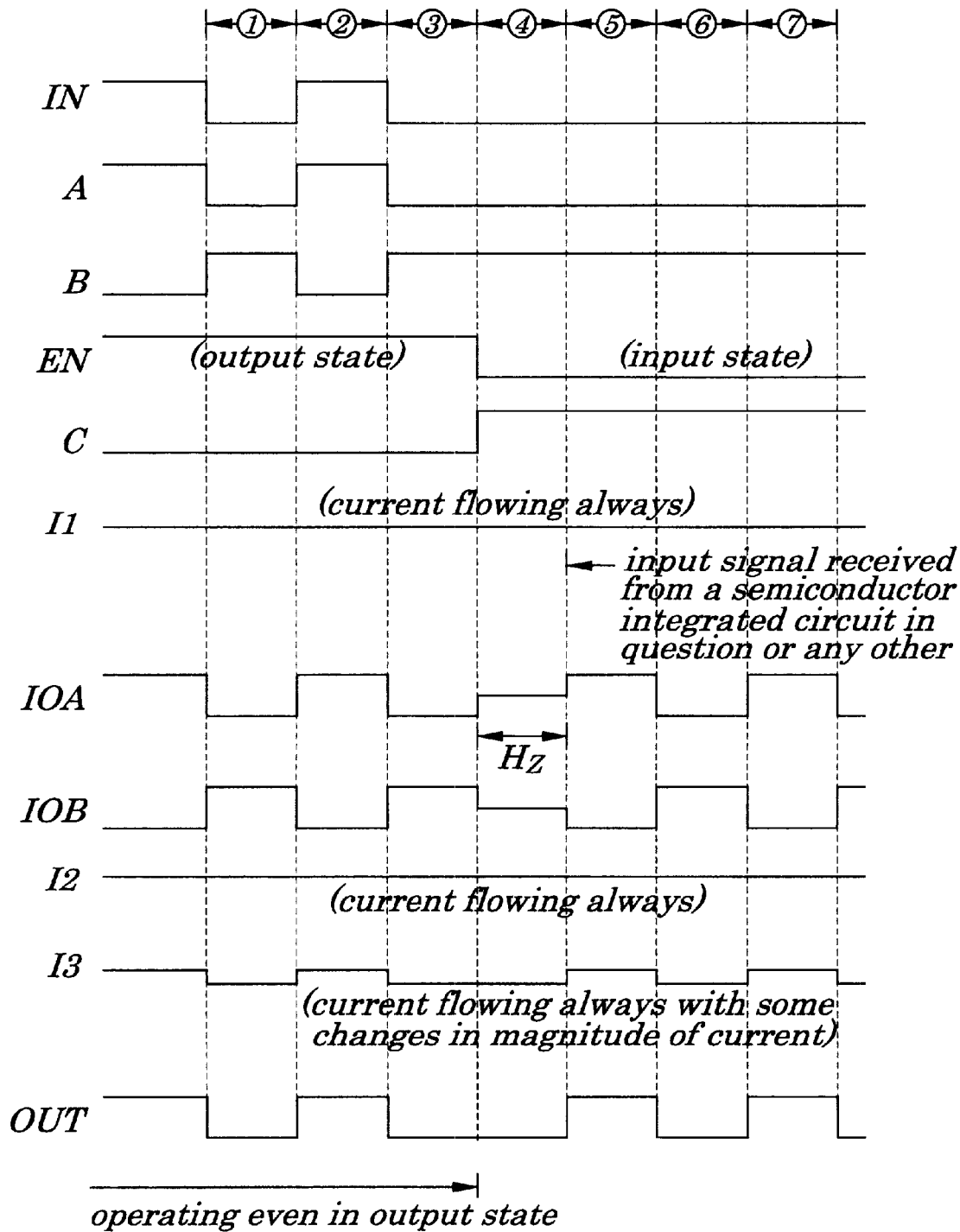
FIG. 8 is a time chart showing operations of an input/output circuit of the same signal transmission system as that shown in FIG. 4.

Therefore, description of these components shown in FIGS. 5–7 is omitted here because those like components are indicated by the same reference numerals as those shown in FIGS. 1 and 2.

Next, operations of this embodiment are described with reference to FIGS. 1, 2, 3, and 6.

Basic operations for inputting and outputting of a signal in this embodiment are roughly the same as those described with reference to FIGS. 5–8.

A large difference between these is that in this embodiment, when the output circuit 12A is supplied with a high level of the Enable signal and operating, the input circuit 14A dissipates no power, while on the other hand, when the input circuit 14A is supplied with a low level of the Enable signal and operating, the output circuit 12A dissipates no power.

In addition, this embodiment is so configured that when the input circuit 14A is supplied with a high level of the Enable signal and not operating, from its output terminal to a CMOS internal circuit to which that output terminal is connected, a signal is supplied that represents a value expected at that CMOS internal circuit.

Before describing about that, first, operations are described of the output circuit 12A in a state where it is supplied with the above-mentioned high level of the Enable signal EN.

Figure 3:
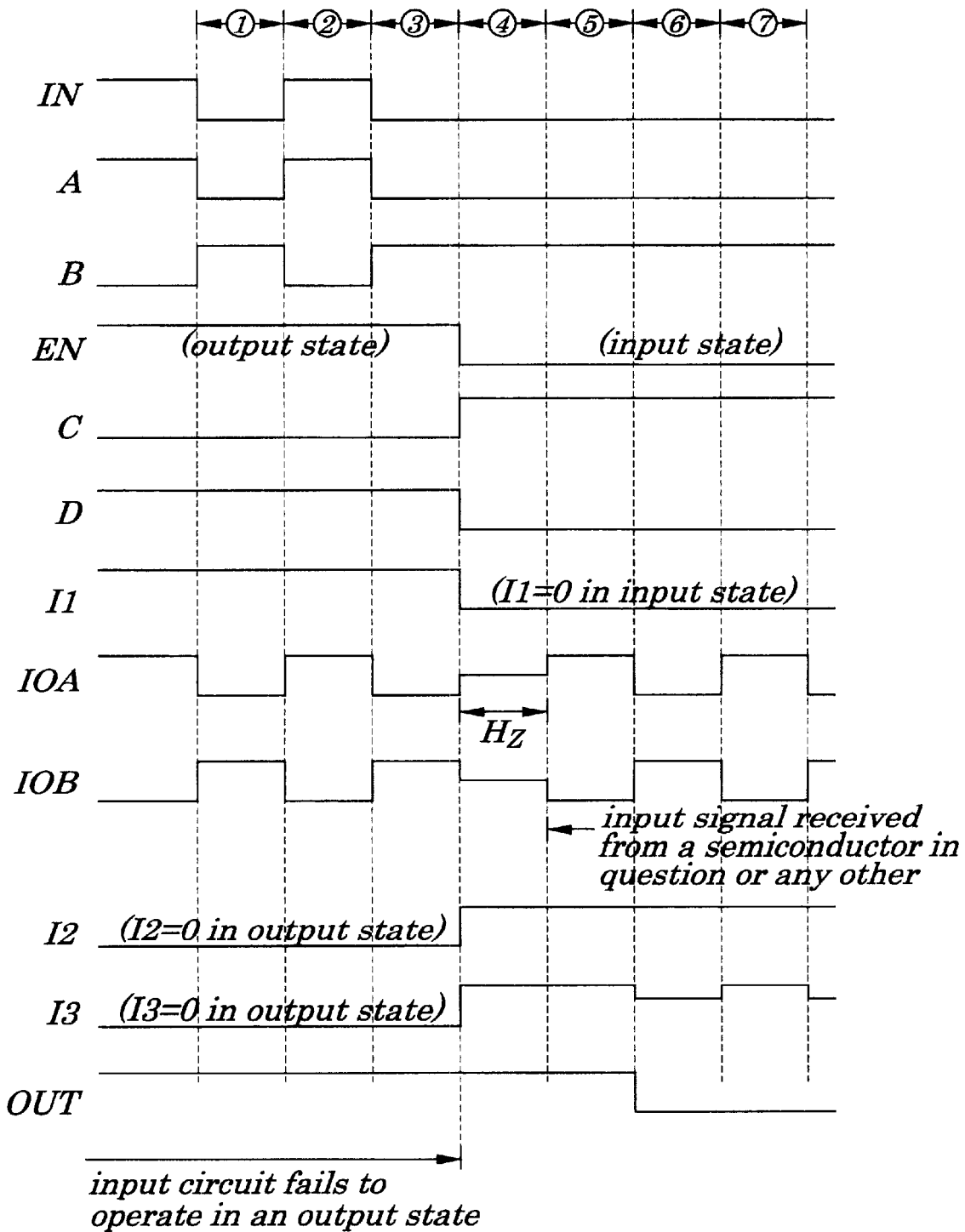
FIG. 3 is a time chart showing operations of the same input/output circuit as that shown in FIG. 1.
Figure 4:
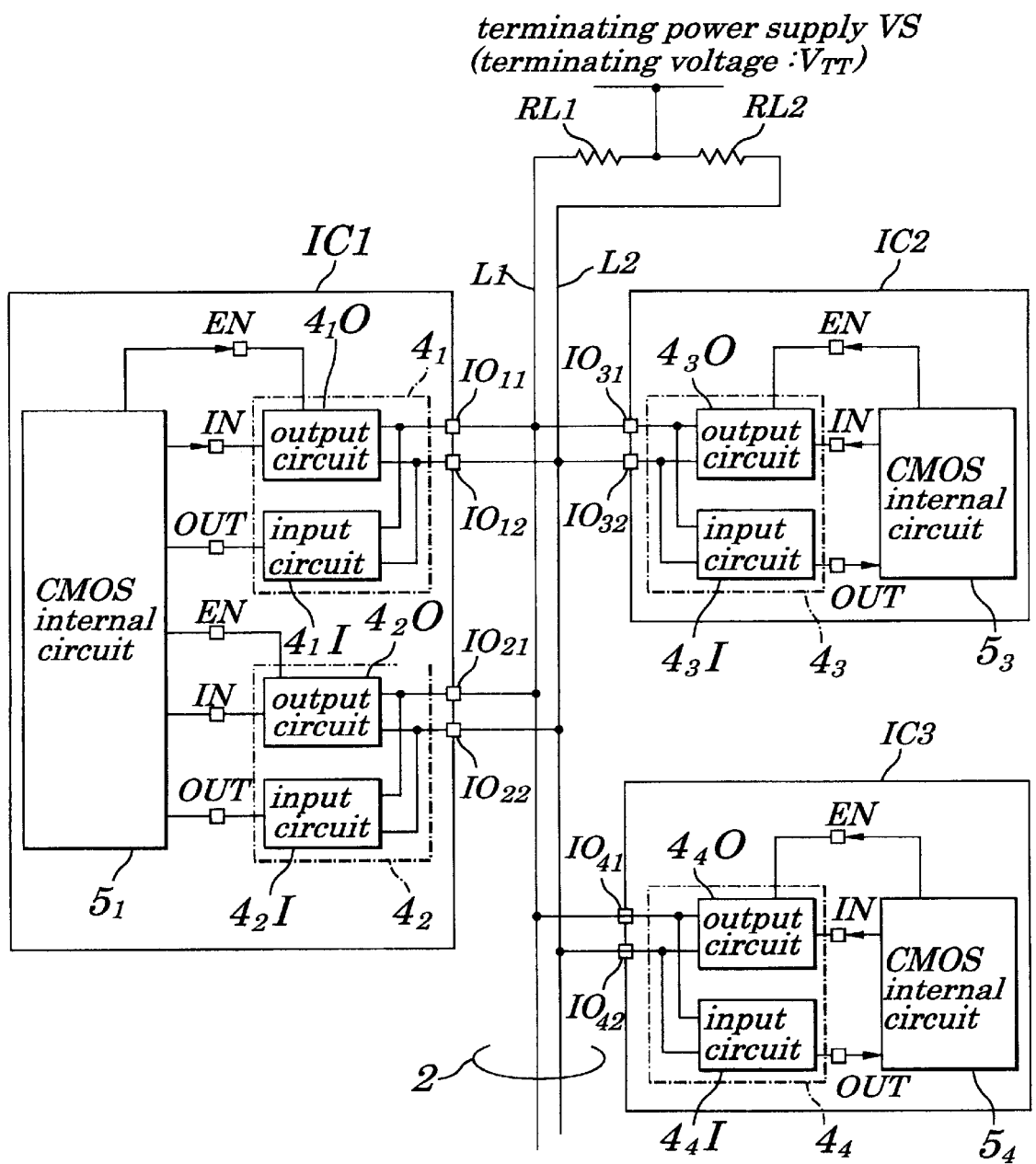
FIG. 4 is a block diagram indicating a configuration of a signal transmission system which uses conventional semiconductor integrated circuits.

In this case, when a high level of the Enable signal is input to the make-and-break control-signal generating circuit 22A at its ENABLE input terminal 39 (period ① in FIG. 3-EN), a low-level signal C is output from the make-and-break control-signal generating circuit 22A at its output terminal 40 (period ① in FIG. 3-C) and a high-level signal D, at its output terminal 41 (period ① in FIG. 3-C). When such a binary-value input signal as shown in FIG. 3-IN is input to the input-signal supply circuit 16 at its input terminal 28 with a high level of the Enable signal being applied (period ① in FIG. 3-IN), such a low-level signal A as shown in period ① in FIG. 3-A is output from the input-signal supply circuit 16 at its output terminal 34 and, at the same time, such a high-level signal B as shown in period ① in FIG. 3-B is output from the input-signal supply circuit 16 at its output terminal 36.

With this, since the signal D is at a high level and the signal C is at a low level, the n-channel type MOSFET N15 of the output circuit 14A is turned on and its n-channel type MOSFET N16 is turned off, thus causing the n-channel type MOSFET N3 of the differential amplifier stage 20 and the n-channel type MOSFET N6 of the differential amplifier stage 24 to operate as a current source. Through the n-channel type MOSFET N3, a current I1 flows (period ① in FIG. 3-I1). Therefore, the differential amplifier stage 20 operates like the conventional circuit shown in FIG. 5.

At this point in time, the n-channel type MOSFET N6 also operates as a current source with the signal C being at a low level, to turn on the p-channel type MOSFETs O1 and P2, so that the differential amplifier stage 24 also operates like the conventional circuit shown in FIG. 5.

Also, since the signal C is at a low level, the n-channel type MOSFETs N8 and N10 are turned off, thus causing the output stage 26 also to operate like the conventional circuit shown in FIG. 5.

Thus, as described about the conventional circuit shown in FIG. 5, from the output terminals 27 and 29 of the output circuit 12A, output signals IOA and IOB are output which correspond to the input signal IN (period ① in FIGS. 3-IOA and 3-IOB).

Next, operations of the input circuit 14A are described in a case where it is supplied with the above-mentioned high level of the Enable signal EN.

Since the signal D is at a high level and the signal C is at a low level, the n-channel type MOSFET N17 is turned off and the n-channel type MOSFET N18 is turned on, so that the n-channel type MOSFET N13 does not operate as a current source. Therefore, no current flows through the n-channel type MOSFET N13 (period ① in FIG. 3-I2). Since the n-channel type MOSFET N13 does not operate as a current source in such a way and, in addition to that, the p-channel type MOSFET P6 is turned on to thereby turn off the p-channel type MOSFETs P3 and P4, no power is dissipated at the differential amplifier 42A. Also, since a low-level voltage is applied to the n-channel type MOSFET N14 at its gate, no current flows through that FET N14 (period ① in FIG. 3-I3), thus preventing it from acting as an active load. Therefore, no power is dissipated at the output stage 44A.

Although no current flows through the output stage 44A with both the p-channel type MOSFET P5 and the n-channel type MOSFET N14 being turned off and therefore that stage 44A has its output terminal in a high-impedance state. The signal D is set at a high level, the OR circuit 45 outputs a high-level signal (period ① in FIG. 3-OUT).

Therefore, since the OR circuit 45 has its output connected to the output stage 44A at its output terminal, it is possible to supply to a CMOS internal circuit a signal of an expected value required by the CMOS internal circuit connected to the input circuit 14A at its output terminal OUT. The expected value is a high level in this embodiment. An expected value here refers to a value that has the same level as that of a signal received first by the input circuit 14A when it initiates its operations. One example of validating an initial value (expected value) of a signal received upon this initiation of the input operations is a high-speed serial-bus interface mode called IEEE1394. The IEEE1394 transmission mode is used to transfer one data piece and a reconciliation signal by using two combinations of differential signals (four signals); in this embodiment, two combinations of such an input/output circuit 10A as shown in FIG. 1 are used to transmit and receive the above-mentioned data and the reconciliation signal.

In the IEEE1394 transmission mode, an input circuit, before receiving a data signal, surely receives a reconciliation signal called a data prefix, the logic of which is predefined in such a way that the first combination of the above-mentioned two combinations of signal logic always indicates "1" and the second combination, "0."

If, therefore, an input circuit 14A is used, for example, as an input circuit for the above-mentioned first combination, the above-mentioned expected value matches a signal received first upon initialization of input operations.

To output an expected value of "0" of the second combination on the other hand, it is enough only to replace the OR circuit in the input circuit 14A with an AND circuit and, at the same time, utilize the signal C in place of the signal D.

With this, when initiating its input operations, the input circuit can transfer the logic of the above-mentioned reconciliation signal to the following stage of a CMOS internal circuit without an error.

When the Enable signal EN is switched from a high level to a low level, a high level of the signal C is output from the make-and-break control-signal generating circuit 22A at its output terminal 40 and a low level of the signal D, at its output terminal 41.

Then, the n-channel type MOSFET N15 is turned off and the n-channel type MOSFET N16 is turned on. With this, none of the n-channel type MOSFETs N3 and N6 operate as a current source. Therefore, no power is dissipated at the differential amplifier stage 20.

Also, thus, the n-channel type MOSFET N6 does not operate as a current source and, in addition to that, the p-channel type MOSFETs P1 and P2 are turned off, no power is dissipated at the differential amplifier stage 24.

At this point in time, like the conventional input/output circuit, the voltage level of an output provided from the differential amplifier stage 24A at its output terminals O3 and O4 is set to the ground potential because the n-channel type MOSFETs N8 and N10 are turned on, thereby completely turning off the n-channel type MOSFETs N7 and N9 which constitute the output stage 26 of the output circuit 12A.

Therefore, a high-impedance state is set between the output terminals OUTA and OUTB of the output stage 26.

Operations performed from a point in time that this high-impedance state is set up to a point in time that an input signal is transmitted from a semiconductor integrated circuit in question or any other to the input circuit of the concerned input/output circuit are the same as those described with reference to FIGS. 5 through 8 (period ⑤ and subsequent in FIG. 3).

Thus, with a configuration according to the present embodiment, in such a signal transmission system provided with an input/output circuit that the output terminals 27 and 29 of the output circuit 12A of the input/output circuit 10A serve as output terminals connected to the bus line 2 and, at the same time, as input terminals of the input circuit 14A, when a control signal (low-level Enable signal) which puts the output terminals of the output circuit 12A into a high-impedance state is supplied to the output circuit 12A and the input circuit 14A, it is possible to start feeding power to the input circuit 14A to operate it and, at the same time, stop feeding power to the output circuit 12A and also, when the above-mentioned control signal is not supplied to the output circuit 12A nor the input circuit 14A, it is also possible to start feeding power to the output circuit 12A to operate it and, at the same time, stop feeding power to the input circuit 14A. Therefore, it is possible to eliminate power dissipation at the output circuit 12A and the input circuit 14A by using the control signal which puts the output terminal of the output circuit 12A into a high-impedance state.

Also, if the input circuit 14A does not operate even when it is supplied with the control signal which puts the output terminal of the output circuit 12A into a high-impedance state, when a signal processing circuit connected to the input circuit 14A at its output terminal starts receiving a signal from the input circuit 14A, a signal having such a level that is desired to be output from the input circuit 14A, i.e. a signal of an expected value can be output from the OR circuit 45 based on the above-mentioned control signal.

Since a signal of an expected value based on the control signal can be output from the input circuit 14A, there is no possibility of the CMOS internal circuit receiving error data.

It is apparent that the present invention is not limited to the above embodiments but may be changed and modified without departing from the scope and spirit of the invention. For example, the Enable signal may be supplied to the output circuit 12A and the input circuit 14A through a plurality of separate input terminals in place of conventional one terminal. Also, separate signals may be used in such a way that one of the signals would render the output circuit inoperative to put its output terminals in a high-impedance state and at the same time make the input circuit operative and the other signal would make the output circuit operative and at the same time render the input circuit inoperative.

Also, make-and-break control by use of the Enable signal may be conducted by a switching device inserted in series with the current source.

Also, as a signal of an expected value, a low-level voltage may be output. To output the expected value, an AND circuit is used.

As mentioned above, according to a configuration of the present invention, in an input/output circuit in which output terminals of an output circuit are connected to input terminals of an input circuit or in a signal transmission system provided with such an input/output circuit, when a control signal which puts the output terminals of the output circuit into a high-impedance state is supplied to the output and input circuits, power is fed to the input circuit to operate it and at the same time is stopped to the output circuit and also, when the above-mentioned control signal is not supplied to the output circuit nor to the input circuit, power is fed to the output circuit to operate it and at the same time is stopped to the input circuit, so that the control signal may put the output terminals of the output circuit into a high-impedance state and at the same time serves as a make-and-break control signal in the output and input circuits, thus providing a high-impedance state of the output terminals of the output circuit even when it is not operating and at the same time saving power dissipation of the input circuit. Also, it is possible to save power dissipation when the input circuit is operating.

Also, since in the configuration, an input circuit is used as a circuit which can output a signal of an expected value based on the control signal which puts the output terminals of an output circuit into a high-impedance state, thus making it possible to output from the input circuit a signal of an expected value based on the concerned control signal. Therefore, there is no possibility for a signal-processing circuit connected to the input circuit to receive error data.

It is thus apparent that the present invention is not limited to the above embodiments but may be changed and modified without departing from the scope and spirit of the invention.

Finally, the present application claims the priority based on Japanese Patent Application No. Hei10-353564 filed on Dec. 11, 1998, which is herein incorporated by reference.

What is claimed is:

1. An input/output circuit which comprises an output circuit and an input circuit which has an input terminal thereof connected with said output circuit at an output terminal thereof in such a configuration that when a control signal is supplied to said output circuit, said output terminal of said output circuit is put into a high-impedance state, wherein such a power-feeding control circuit is provided to said input circuit that feeds power to said input circuit when said control signal is supplied and stops a current source for feeding power to said input circuit when said control signal is not supplied, wherein said power-feeding control circuit provided to said input circuit acts to turn on/off a current source of a differential amplifier stage which constitutes said input circuit.

2. An input/output circuit which comprises an output circuit and an input circuit which has an input terminal thereof connected with said output circuit at an output terminal thereof in such a configuration that when a control signal is supplied to said output circuit, said output terminal of said output circuit is put into a high-impedance state, wherein such a power-feeding control circuit is provided to said input circuit that feeds power to said input circuit when said control signal is supplied and stops a current source for feeding power to said input circuit when said control signal is not supplied, wherein said output circuit is comprised of a differential amplifier stage including said current source; and a power-feeding control circuit provided to said output circuit turns on/off said current source included in said differential amplifier stage.

3. A signal transmission system which comprises an input/output circuit which circuit has: a semiconductor integrated circuit which has at least an input/output circuit which has an output circuit and an input circuit which has an input terminal thereof connected to said output circuit at an output terminal thereof in such a configuration that when a control signal is supplied to said output circuit, said output circuit has an output terminal thereof put into a high-impedance state; and a bus line which interconnects an output terminal of said output circuit of said semiconductor integrated circuit and an input terminal of said input circuit, wherein said input circuit is provided with such a power-feeding control circuit for feeding power to said input circuit when said control signal is supplied to said input circuit and stops a current source for feeding power to said input circuit when said control signal is not supplied to said input circuit, wherein said input circuit is comprised of a differential amplifier stage which includes said current source; and a power-feeding control circuit provided to said input circuit turns on/off said current source included in said differential amplifier stage.

4. A signal transmission system which comprises an input/output circuit which circuit has: a semiconductor integrated circuit which has at least an input/output circuit which has an output circuit and an input circuit which has an input terminal thereof connected to said output circuit at an output terminal thereof in such a configuration that when a control signal is supplied to said output circuit, said output circuit has an output terminal thereof put into a high-impedance state; and a bus line which interconnects an output terminal of said output circuit of said semiconductor integrated circuit and an input terminal of said input circuit, wherein said input circuit is provided with such a power-feeding control circuit for feeding power to said input circuit when said control signal is supplied to said input circuit and stops a current source for feeding power to said input circuit when said control signal is not supplied to said input circuit, wherein a power-feeding control circuit provided to said input circuit turns on/off an active load of an output stage which constitutes said input circuit, wherein said output circuit is comprised of a differential amplifier stage which includes said current source; and a power-feeding control circuit provided to said output circuit turns on/off said current source included in said differential amplifier stage.

* * * * *